J. L. CONNER.
MEASURING INSTRUMENT.
APPLICATION FILED JULY 28, 1916.
1,229,233.
Patented June 12, 1917.
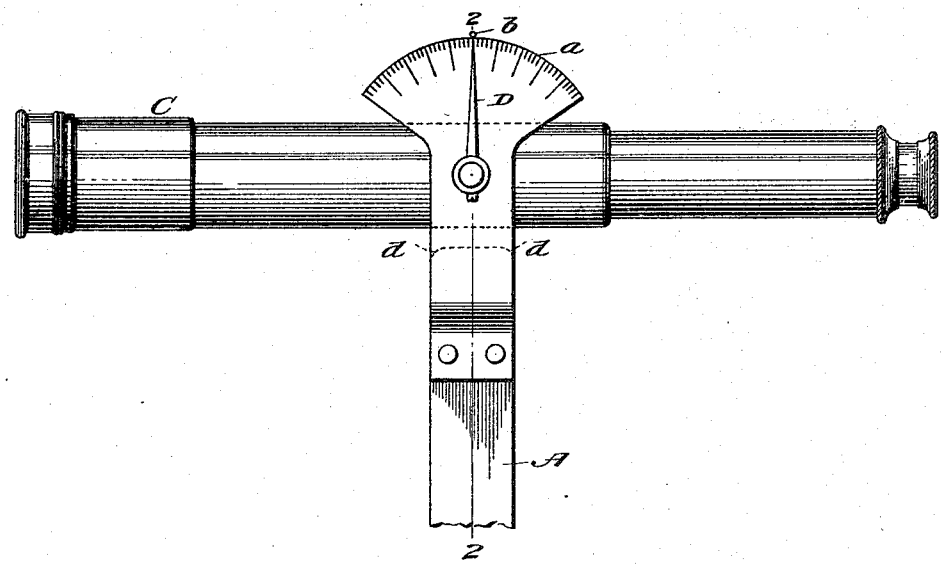
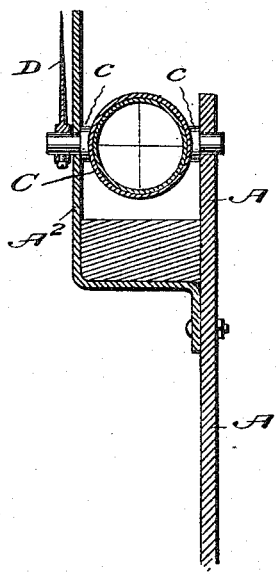
Witness
Inventor
John L. Conner.
By T. Walter Fowler
Attorney

UNITED STATES PATENT OFFICE.

JOHN L. CONNER, OF WASHINGTON, DISTRICT OF COLUMBIA.

MEASURING INSTRUMENT.

1,229,233.          Specification of Letters Patent.      Patented June 12, 1917.

Application filed July 28, 1916. Serial No. 111,916.

*To all whom it may concern:*

Be it known that I, JOHN L. CONNER, a citizen of the United States, residing at Washington, in the District of Columbia, have invented certain new and useful Improvements in Measuring Instruments, of which the following is a specification.

My invention relates to certain new and useful improvements in measuring instruments and particularly those of the type which are generally known as range finders and which are used for accurately ascertaining distances; a leading object of the invention being to provide an instrument of more simple character than those heretofore used for ascertaining the location and distance of a given object.

With the above and other objects in view, my invention consists of the parts and the constructions, arrangements and combinations of parts which I will hereinafter describe and claim.

In the accompanying drawing forming part of this specification and in which similar reference characters indicate like parts in the several views;

Figure 1 is a side elevation of a measuring instrument embodying my invention.

Fig. 2 is a cross sectional view of the same on the line 2—2 of Fig. 1.

In carrying out the invention it is my purpose to mount the instrument upon some suitable support, A, which may be some fixed portion of a gun-carriage, if the salient parts of the invention are to be used therewith. The support is, however, shown in the form of an upright, A, the upper portion of which is forked to form the spaced members, A′, A², said members being arranged in parallelism and one member, A², having its major axis perpendicular, the upper portion of said member being in the form of a segment and having its outer face provided with a suitable curved scale, $a$, which may be of any particular arrangement and in the form herein shown said scale is measured right and left from a vertical zero line, $b$, and which scales it must be assumed have been previously calculated according to various elevations at which the instrument may be employed or the inclination to which an associated telescope may be adjusted above and below a horizontal line.

The telescope, C, may be of the usual type and provided with the customary hair-lines or cross-wires, for the purpose of giving the observer the true point of view, said telescope having on its opposite sides suitable trunnions, $c$, which are mounted to turn in bearings in the upper portion of the forked upright. The degree of the inclination to which the telescope may be tilted or oscillated, either upwardly or downwardly about said trunnions, may be determined by suitable shoulders, $d$, at the base of the forked portions of the upright, and one of which forked portions is represented by the shank of the graduated sector, above mentioned.

Associated with the graduated sector is a pointer, D, which normally is maintained in substantially upright position. In other words, this pointer is normally arranged perpendicular to the longitudinal axis of the telescope and its outer end is designed to register with the vertical zero mark at the center of the graduated scale, and to move over the scale as the telescope is oscillated. The pointer is fixed to one of the trunnions of the telescope so that when the telescope is tilted either upwardly or downwardly about its trunnions to bring the desired object into a true point of view, which may be determined by the operator focusing the instrument upon said object in a customary manner, the pointer will be moved either to the left or to the right, according to the direction of inclination of the telescope. When the desired adjustment has been obtained, the operator may read upon the dial the number of degrees the pointer has moved from the zero point and thus determine the number of yards or the distance the object is from the observer, it being understood that the graduations on the scale have been predetermined and laid out according to the yards of elevation or other divisions of distance.

In practice, the instrument will be supplied with such accessories as may be useful in like devices, but as these form no part of the present invention, they are not referred to. An instrument such as I have described is simple in character as it contains but few parts and the pointer and associated scale work about a common center which is represented by the transverse axis about which the telescope may oscillate. Such a construction enables the device to be used for ascertaining altitudes when desired, and may also be employed as a sight for ordnance and the like.

What I claim as new and desire to secure by Letters Patent is:

1. In a measuring instrument of the character described, the combination of a support which includes a normally perpendicular upwardly presented sector having a graduated scale reading right and left of a vertical zero line; a telescope having trunnions disposed below said scale upon which trunnions the telescope is oscillatable; and a pointer fixed to one of said trunnions and normally perpendicular to the longitudinal axis of the telescope and projecting upwardly and arranged to turn to the right or left of a vertical line by and in response to the direction of oscillation of the telescope upon its trunnions.

2. In a measuring instrument of the character described, the combination of a support which includes a normally perpendicular upwardly presented sector having a graduated scale reading right and left of a vertical zero line; a telescope having trunnions disposed below said scale upon which trunnions the telescope is oscillatable; and a pointer fixed to one of said trunnions and normally perpendicular to the longitudinal axis of the telescope and projecting upwardly and arranged to turn to the right or left of a vertical line by and in response to the direction of oscillation of the telescope upon its trunnions, said support and the sector portion thereof being spaced from each other and a part within said space having shoulders engageable with the telescope to limit the extent of oscillation thereof.

In testimony whereof I affix my signature.

JOHN L. CONNER.

Copies of this patent may be obtained for five cents each, by addressing the "Commissioner of Patents, Washington, D. C."